US012654532B2

(12) United States Patent (10) Patent No.: US 12,654,532 B2

Volkmer et al. (45) Date of Patent: Jun. 16, 2026

(54) BATTERY SYSTEM AND VEHICLE

(71) Applicant: Dr. Ing. h.c. F. Porsche Aktiengesellschaft, Stuttgart (DE)

(72) Inventors: Christopher Volkmer, Niefern-Oeschelbronn (DE); Philipp Kellner, Renningen-Malmsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 443 days.

(21) Appl. No.: 18/199,602

(22) Filed: May 19, 2023

(65) Prior Publication Data

US 2023/0373285 A1 Nov. 23, 2023

(30) Foreign Application Priority Data

May 20, 2022 (DE) ..................... 10 2022 112 734.6

(51) Int. Cl.
B60K 1/04 (2019.01)
H01M 50/249 (2021.01)
(Continued)

(52) U.S. Cl.
CPC ............. B60K 1/04 (2013.01); H01M 50/249 (2021.01); H01M 50/271 (2021.01);
(Continued)

(58) Field of Classification Search
CPC .............. B60K 1/04; B60K 2001/0438; B60K 2001/0422; B60K 2001/0433; H01M 2220/20
See application file for complete search history.

(56) References Cited

U.S. PATENT DOCUMENTS 6,662,891 B2 12/2003 Misu et al.
9,929,389 B2 3/2018 Klimek et al.
(Continued)

FOREIGN PATENT DOCUMENTS

DE 102016210881 12/2017
DE 102017002249 9/2018
WO 2021214077 10/2021

OTHER PUBLICATIONS

German Search Report dated Apr. 5, 2023.

*Primary Examiner* — Marc Q Jimenez
*Assistant Examiner* — James J Triggs
(74) *Attorney, Agent, or Firm* — Buchanan Ingersoll & Rooney PC

(57) ABSTRACT

A battery system (20) has first and second battery module assemblies (31, 32), a conduction housing (40), a terminal box (50), and a power electronics housing (60). The first and second battery module assemblies (31, 32) are spaced from one another so that two footwells (35, 36) are formed between the first battery module assembly (31) and the second battery module assembly (32). A first section (42) of the conduction housing (40) extends between the footwells (35, 36). A power electronics (61) is provided in the power electronics housing (60). The terminal box (50) comprises at least a first terminal (51) for a first consumer (91). First conductors (41) are provided in the conduction housing (40) and electrically interconnect the first battery module assembly (31), the second battery module assembly (32), at least a first terminal (51), and the power electronics (61).

15 Claims, 3 Drawing Sheets

(51) Int. Cl.
    *H01M 50/271*       (2021.01)
    *H01M 50/583*       (2021.01)
(52) U.S. Cl.
    CPC ... *H01M 50/583* (2021.01); *B60K 2001/0422*
           (2013.01); *B60K 2001/0433* (2013.01); *H01M*
                                      *2220/20* (2013.01)

(56)                  References Cited

U.S. PATENT DOCUMENTS

| | | | |
|---|---|---|---|
| 10,549,619 B2 * | 2/2020 | Nakayama | .......... H01M 50/204 |
| 10,766,347 B2 | 9/2020 | Iwasa et al. | |
| 2003/0230443 A1 * | 12/2003 | Cramer | ................ B62D 21/152 |
| | | | 180/65.51 |
| 2014/0124278 A1 | 5/2014 | Takamura et al. | |
| 2016/0141586 A1 | 5/2016 | Fujii et al. | |
| 2019/0157851 A1 | 5/2019 | Okamoto et al. | |
| 2023/0039653 A1 | 2/2023 | Eiletz et al. | |

* cited by examiner

BATTERY SYSTEM AND VEHICLE

CROSS REFERENCE TO RELATED APPLICATION

This application claims priority on German Patent Appl. No 10 2022 112 734.6 filed May 20, 2022, the entire disclosure of which is incorporated herein by reference.

BACKGROUND

Field of the Invention

The invention relates to a battery system, a vehicle having such a battery system, and a method for manufacturing the vehicle.

Related Art

US 2016/0141586 A1 discloses a high-voltage battery with two battery stacks.

WO 2021/214 077 A1 discloses a high-voltage battery with two modules that are spaced apart.

US 2019/0157851 A1 discloses a battery with a front-faced flat bracket.

U.S. Pat. No. 6,662,891 B2 discloses a traction battery with an opening in the underbody.

DE 10 2017 002 249 A1 discloses a body for a battery-electric vehicle.

U.S. Pat. No. 10,549,619 B2 discloses a traction battery with a tray.

U.S. Pat. No. 9,929,389 B2 discloses an arrangement with a bottom plate and a partition wall.

SUMMARY OF THE INVENTION

A battery system for an electrically or semi-electrically operated vehicle comprises a first battery module assembly, a second battery module assembly, a conduction housing, a terminal box, and a power electronics housing. The first battery module assembly comprises at least a first battery module, and the second battery module assembly comprises at least a second battery module. The first and second battery module assemblies are spaced apart from one another in such a way that two footwells are formed between the first and second battery module assemblies. A first section of the conduction housing extends between the two footwells. Power electronics are provided in the power electronics housing. The terminal box comprises at least a first terminal for a first consumer. First conductors are provided in the conduction housing and electrically interconnect the first battery module assembly, the second battery module assembly, at least a first terminal, and the power electronics.

The battery system is simple to install, and it is not necessary to provide a battery box in which the battery cells and the power electronics are accommodated. The terminal box facilitates the connection of consumers in the front region of a vehicle.

The power electronics housing is provided at least partially on the side of the second battery module assembly facing away from the first battery module assembly, thereby enabling a flat design of the vehicle.

At least a second terminal for a second consumer is provided on the power electronics housing in some embodiments. The second terminal allows a connection of a consumer on the side of the power electronics housing. This is particularly advantageous when consumers are provided in both the front and rear regions of the vehicle, for example in a four-wheel drive vehicle. The two terminals result in short connection paths.

The terminal box of some embodiments is connected to the first conductors in the region of the first section of the conduction housing. This results in good contact with low resistance.

According to some embodiments, at least part of the conduction housing is arranged: above the first battery module assembly; above the second battery module assembly, or above the first battery module assembly and above the second battery module assembly. This arrangement facilitates assembly and contacting.

In one embodiment, the conduction housing comprises a bottom tray and a lid, and the first conductors extend at least partially between the bottom tray and the lid. The bottom tray comprises a terminal region for the first battery module assembly, the second battery module assembly, the terminal box, and the power electronics housing.

The terminal box of some embodiments is fastened to the bottom tray. As a result, the terminal box can be assembled together with the bottom tray in advance.

According to one embodiment, at least one seal is provided at one or more sealing points selected from the group consisting of: a region between the bottom tray and the terminal box; a region between the bottom tray and the first battery module assembly; a region between the bottom tray and the second battery module assembly; a region between the bottom tray and the power electronics housing; and a region between the bottom tray and the lid. The seals reduce the risk of penetration by moisture or dirt.

The terminal box may comprise at least one fuse for preventing excessive current through the first conductors and reducing the risk of destruction of the battery system due to excessive current.

The terminal box of some embodiments has an opening at its bottom and a lid to allow for a replacement of the fuse through the opening when the lid is removed. This embodiment facilitates replacement of the fuse.

The first and second battery module assemblies of some embodiments are configured as high-voltage battery module assemblies. High-voltage batteries have DC voltages in the range of 60 V to 1.5 kV or AC voltages in the range of 30 V to 1 kV, and thus are particularly well suited for electrically driven vehicles.

The first conductors of some embodiments are configured at least in sections as busbars, in particular in the first section. Busbars allow for a comparatively high mechanical intrinsic stability and low electrical resistance. Unshielded, rigid busbars can be employed, and heavier and more expensive flexible cables can be avoided in the regions of the busbars.

The first and second battery module assemblies may be configured as sealed battery module assemblies, or may comprise sealed battery modules. The reliability of the battery system as a whole can thereby be increased.

The first consumer may be a main consumer, such as an electric motor, or a secondary consumer, such as a heater or an active chassis.

A vehicle in accordance with an embodiment of this disclosure may configured as an electrically or semi-electrically operated vehicle that comprises an embodiment of the above-described battery system. The battery system with the above-described footwells is particularly well-suited for vehicles.

The vehicle of some embodiments comprises first seats and second seats arranged behind the first seats, and the footwells are associated with the second seats.

In some embodiments, at least part of the first battery module assembly is arranged under the first seats, and at least part of the second battery module assembly is arranged under the second seats to achieve in a compact design.

A connecting cable may be provided to connect the first terminal to the first consumer. The connection cable may extend, at least in sections, along the conduction housing into a front region of the vehicle for connection to the first consumer. Thus, the cable length can be kept comparatively low.

At least part of the connecting cable may extend parallel to the conduction housing to achieve a compact design.

The vehicle may comprise removable components on the bottom and may be configured to allow removal of the battery system on the bottom of the vehicle while the consumers can remain in the vehicle.

This disclosure also relates to a method for manufacturing a vehicle that comprises a body, a front axle, a rear axle, and a third consumer with a connecting cable. The method comprises positioning the battery system, the front axle, the rear axle, and the third consumer on a mounting support; connecting the third consumer to the first terminal or the second terminal via the connecting cable; moving the battery system, the front axle, the rear axle, and the consumer into the body simultaneously; and mechanically joining the battery system, the front axle, the rear axle, and the consumer to the body.

The battery system can thus be assembled largely outside of the body, and no joining steps or only a few joining steps are required within the body.

Further details and developments of the invention will emerge from the examples described below and illustrated in the drawings. The description and the drawings are not to be construed as limiting the invention in any way. The features mentioned above and those yet to be discussed below can be used in the specified combinations, in other combinations or on their own, without departing from the scope of the invention.

DETAILED DESCRIPTION

Figure 1:
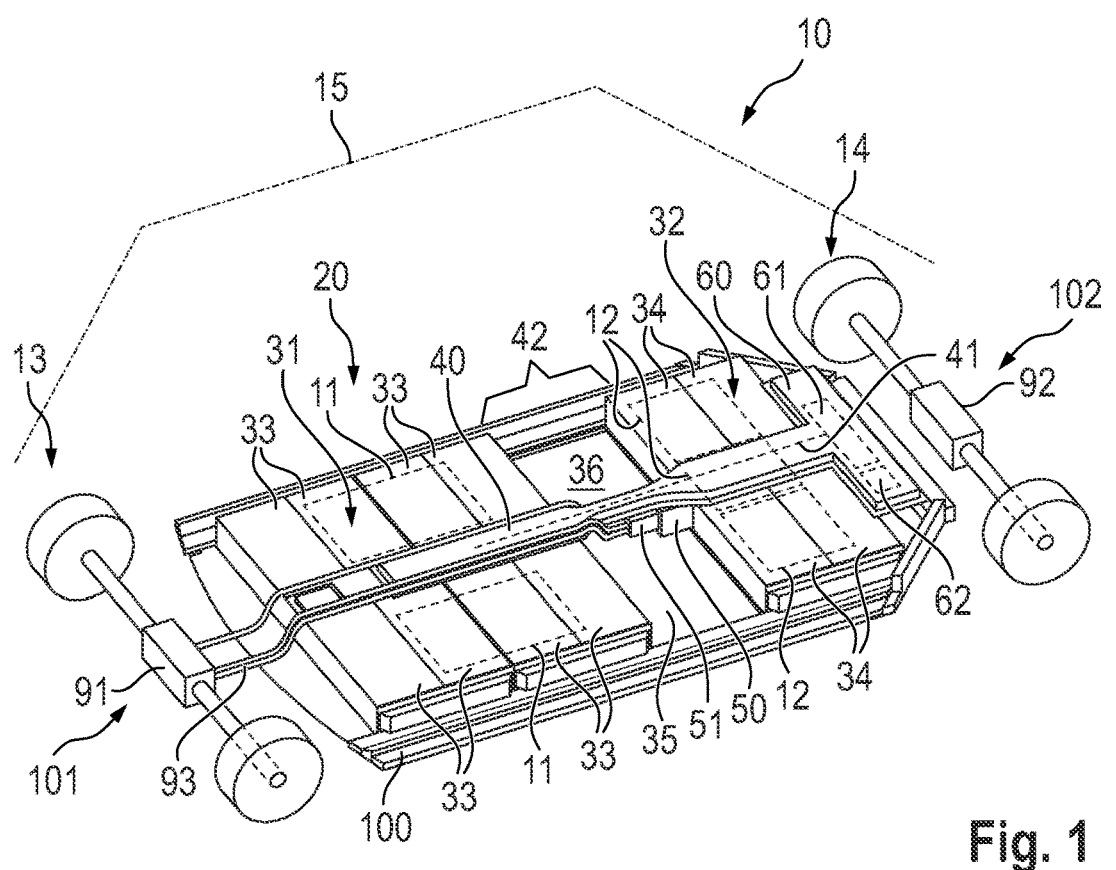
FIG. 1 is a schematic perspective view of a vehicle having a battery system

Parts that are the same or have the same effect bear the same reference numerals in the following and are generally described only once. The descriptions of all of the figures build on one another to avoid unnecessary repetitions.

FIG. 1 shows a schematic view of a vehicle 10. The vehicle 10 comprises a battery system 20, a front axle 101 with a first consumer 91, a rear axle 102 with a second consumer 92, and a body 15. Preferably, the first consumer 91 and the second consumer 92 are electric motors, and they allow an electrical or semi-electrical operation of the vehicle 10. The battery system 20 can also provide electrical power to other main consumers and/or secondary consumers.

The vehicle 10 comprises a front region 13 and a rear region 14.

In the lower region of the battery system 20, for example, there is provided an underride protection or panel 100.

The battery system 20 comprises a first battery module assembly 31, a second battery module assembly 32, a conduction housing 40, a terminal box 50, and a power electronics housing 60.

The first battery module assembly 31 comprises at least a first battery module 33, and eight battery modules 33 are provided in the embodiment.

The second battery module assembly 32 comprises at least a second battery module 34, and four second battery modules 34 are provided in the embodiment.

The first and second battery module assemblies 31 and 32 are spaced apart, and footwells 35, 36 are formed between the first battery module assembly 31 and the second battery module assembly 32. A first section 42 of the conduction housing 40 extends between the footwells 35, 36. Footwells 35, 36 accommodate passengers' feet.

The vehicle 10 has first seats 11, and second seats 12 are arranged behind the first seats 11. The seats 11, 12 are indicated schematically in terms of their position and are configured, for example, in the form of a single seat or a bench of seats. Footwells 35, 36 are associated with the second seats 12 and are intended for the rear passengers.

A power electronics 61 is provided in the power electronics housing 60. The power electronics 61 can comprise, for example, current transformers, such as DC/AC converters, DC/DC converters, a battery module control unit or power electronics for activating the consumers 91, 92 or other main or secondary consumers.

The terminal box 50 comprises at least a first terminal 51 for at least one consumer, for example for the consumer 91. The consumer can be a main consumer and/or a secondary consumer.

Conductors 41 are provided in the conduction housing 40 and are indicated schematically. The conductors 41 electrically interconnect the first battery module assembly 31, the second battery module assembly 32, the at least one first terminal 51, and the power electronics 61.

The first conductors 41 are illustrated as busbars, but can be flexible conductors.

The power electronics housing 60 is provided at least partially on the side of the second battery module assembly 32 facing away from the first battery module assembly 31. This allows for a flat configuration of the region of the seats 11, 12, and the power electronics 61 can be accommodated well in the rear region 14 of the vehicle 10.

A second terminal 62 is provided on the power electronics housing 60 for a further consumer, such as the consumer 92.

The conduction housing 40 is provided above the first battery module assembly 31 and above the second battery module assembly 32. As a result, the battery modules 33 and 34 can be positioned relatively close to one another. A connecting cable 93 is connected to the first terminal 51 and extends from there at least in sections along the conduction housing 40 into the front region 13 of the vehicle 10 to supply power to the consumer 91. The connecting cable 93 extends, at least in sections, parallel to the conduction housing 40. In the exemplary embodiment, the connecting cable 93 comprises three conductors, but it can also be more or fewer conductors.

Figure 2:
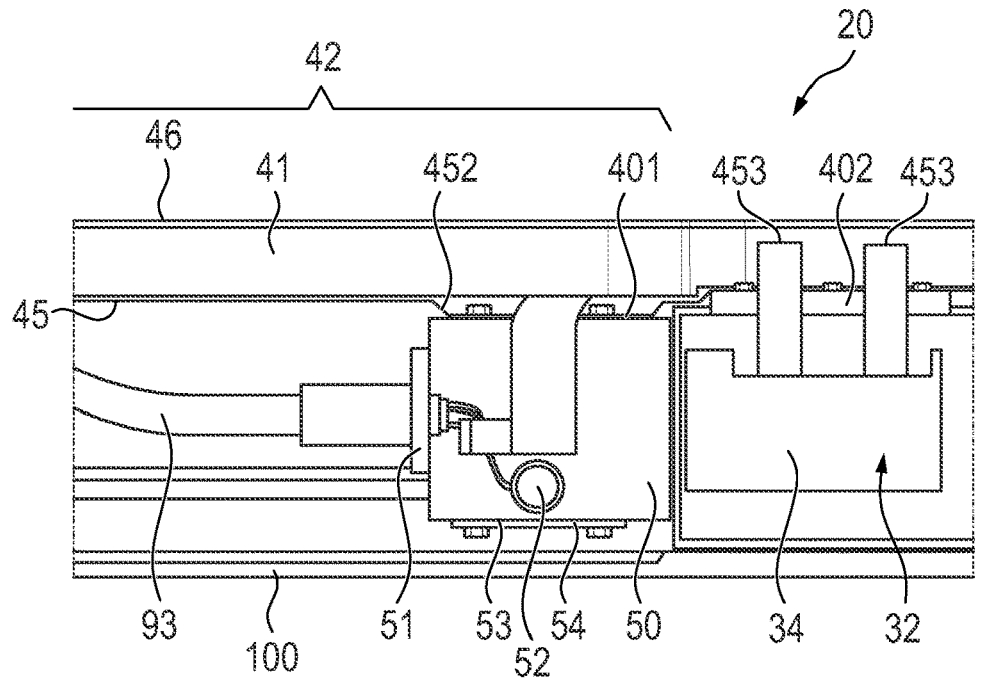
FIG. 2 is a side view of a region of the battery system of FIG. 1.

FIG. 2 is a side view of the battery system 20 in the region of first section 42 of conduction housing 40.

The conduction housing 40 comprises a bottom tray 45 and a lid 46, and the first conductors 41 are provided between the bottom tray 45 and the lid 46. The first conductors 41 are configured as busbars in this embodiment, and they branch into the terminal box 50 in a connection region 452 of the bottom tray 45.

The terminal box 50 is arranged below the conduction housing 40, and is connected to the first conductors 41 in the region of the first section 42 of the conduction housing and also is arranged in this region.

In the illustrated embodiment, the terminal box 50 is fastened to the bottom tray 45, thereby facilitating the assembly of the battery system 20.

The terminal box 50 comprises a fuse 52 to prevent excessive current through the first conductors 41. This is advantageous when current flowing via the connecting cable 93 and the connection 51 is too high, e.g., in the event of a fault of the consumer 91 or a secondary consumer.

The bottom of the terminal box 50 has an opening 53 with a lid 54 to enable replacement of the fuse or fuses 52 through the opening 53 when the lid 54 is removed.

The second battery module assembly 32 with the battery module 34 is connected to the first conductors 41 in a terminal region 453 of the bottom tray 45.

A seal 401 is provided in the region between the bottom tray 45 and the terminal box 50, and a seal 402 is provided in the region between the bottom tray 45 and the second battery module assembly 32. Further seals (not shown) are provided in: the region between the bottom tray 45 and the first battery module assembly 31; the region between the bottom tray 45 and the power electronics housing 60; and the region between the bottom tray 45 and the lid 46. However, only some of the aforementioned sealing points can be provided. The seals allow for a protection against dust and moisture ingress. The interior region of the conduction housing preferably is protected in accordance with the standard of DIN EN 60529 with IP 44 or higher, preferably with IP 67 or higher.

Removable components 100 of the vehicle 10 are provided on the bottom of the battery system 20, for example, an underride protection or a cover. This allows a removal of the battery system 20 on the bottom of the vehicle 10, and the battery system 20 can be moved downward from the body 15 (cf. FIG. 1). Preferably, the connecting cable 93 remains in the vehicle 10. The battery module assemblies 31, 32 can either be removed in a first step before the conduction housing 40 is removed, or the entire battery system 20 can be removed together from the bottom of the vehicle 10.

Figure 3:
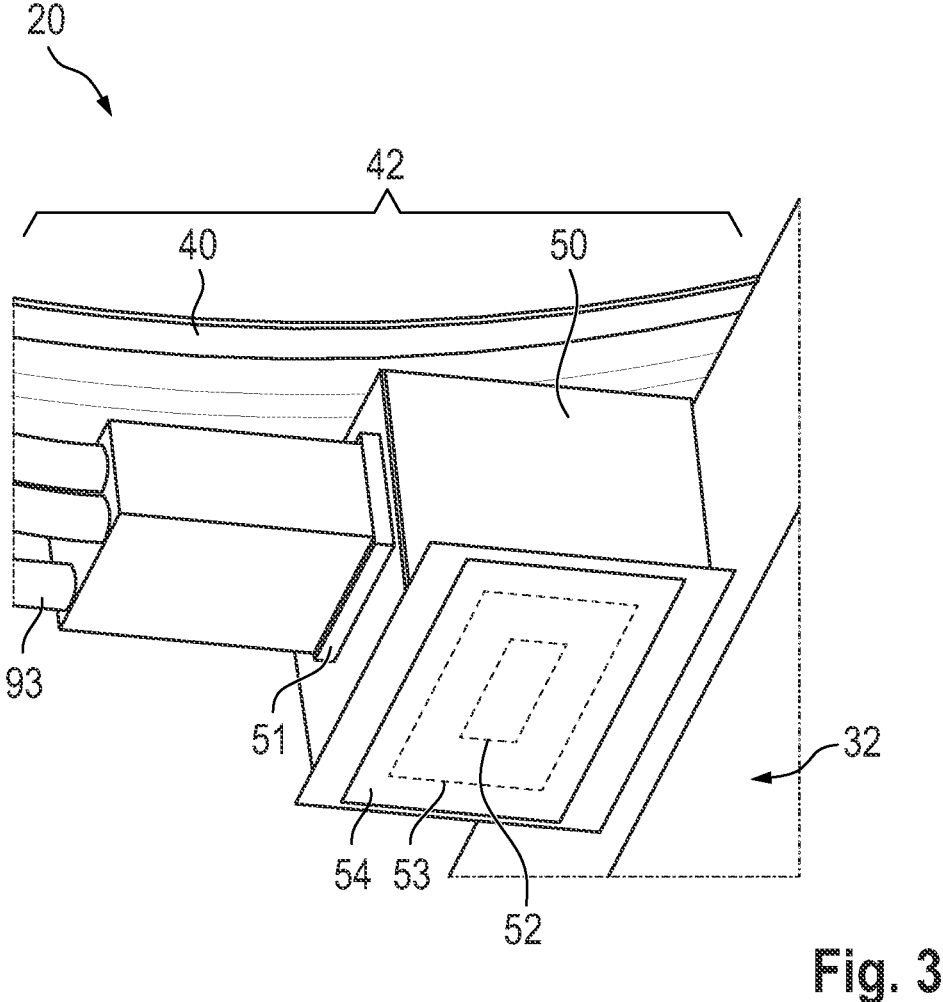
FIG. 3 is a perspective view of a further region of the battery system of FIG. 1.

FIG. 3 is a perspective view from below and shows the first section 42 of the conduction housing 40 and the terminal box 50 at the bottom of the conduction housing 40 with the terminal 51 and the connecting cable 93. The lid 54 is provided on the bottom of the terminal box 50 and covers the schematically suggested opening 53. Access to the fuse 52 in the terminal box 50 is possible via the opening 53, see FIG. 2.

Figure 4:
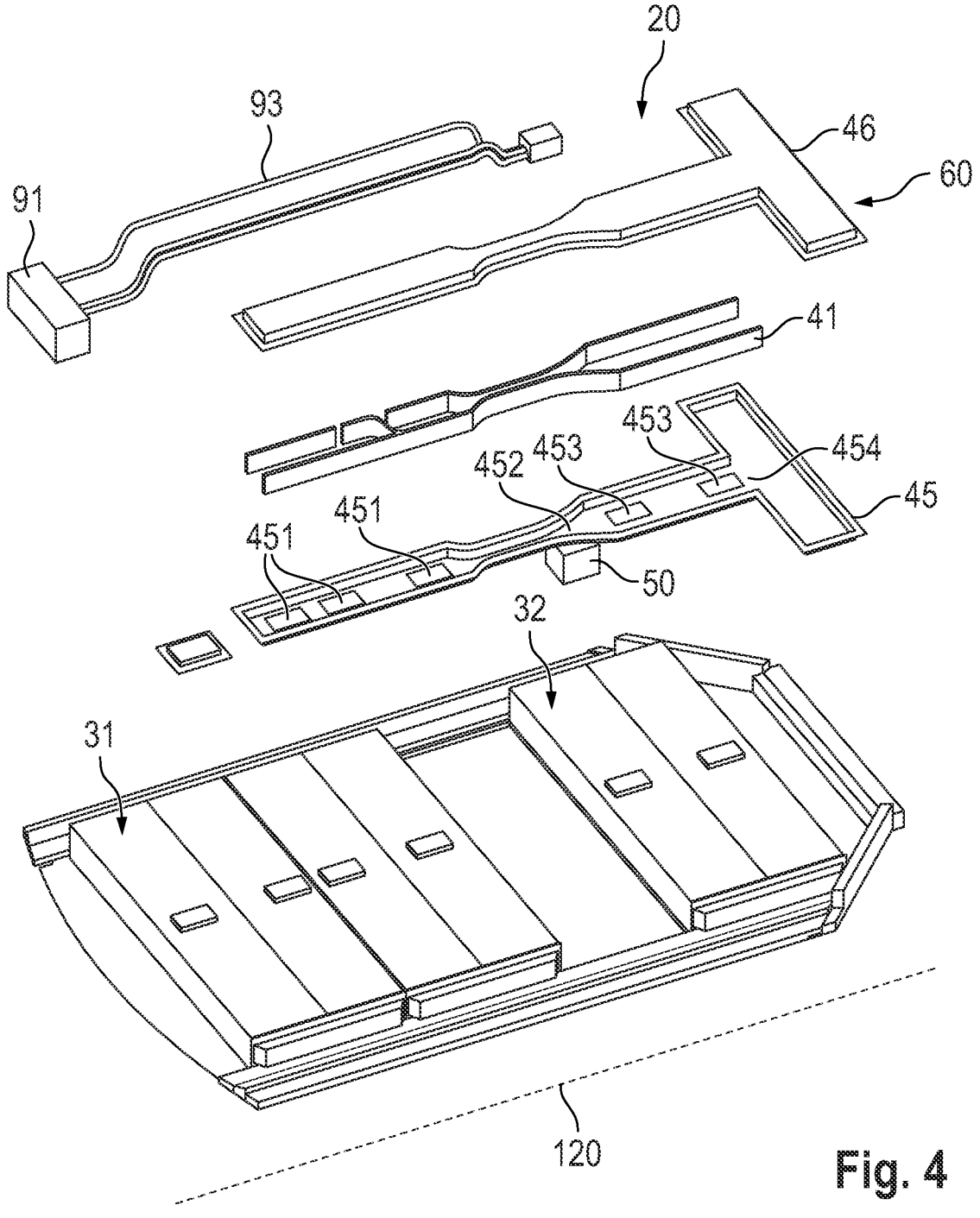
FIG. 4 is an exploded perspective view of the battery system of FIG. 1.

FIG. 4 is an exploded view the battery system 20 and the consumer 91 with the connecting cable 93.

The bottom tray 45 comprises a terminal region 451 for the first battery module arrangement 31, the terminal region 452 for the terminal box 50, the terminal region 453 for the second battery module arrangement 32, and a terminal region 454 for the power electronics housing 60.

In the illustrated embodiment, the power electronics housing 60 is formed by the bottom tray 45 and the lid 46.

During assembly, the battery module assemblies 31, 32 and the power electronics 61 (see FIG. 1) can be provided in a first step.

Subsequently, the bottom tray 45 of the conduction housing 40 can be assembled with the terminal box 50 preassembled from the top, and the connections can be produced via the first conductors 41.

Then, the lid 46 of the conduction housing 40 is placed on top and connected to the bottom tray 45.

In a following step, the battery system 20, a front axle 101, and a rear axle 102 (compare FIG. 1) are placed on top of an assembly support 120 shown schematically. Additionally, the consumer 91 can be provided, and the connecting cable 93 can be plugged into the terminal box 50.

The entire unit then can be moved into the body 15 (compare FIG. 1) via the assembly support 120, for example by lowering the body 15 or raising the assembly support 120.

Accordingly, the axles 101, 102 and the battery system 20 are joined mechanically to the body 15, for example by a bolted connection or a weld connection.

This results in an advantageous assembly of the battery system 20, and there is no or only little wiring within the vehicle 10.

Many variants and modifications are of course possible within the scope of the invention.

The invention claimed is:

1. A battery system (20) for an electrically or semi-electrically operated vehicle (10), comprising:
   a first battery module assembly (31) having at least a first battery module (33);
   a second battery module assembly (32) having at least a second battery module (34), the second battery module assembly (32) being spaced from the first battery module assembly (31) such that two footwells (35, 36) are formed between the first and second battery module assemblies (31, 32);
   a conduction housing (40) having a front section mounted on top of the first battery module assembly (31), a rear section mounted on top of the second battery module assembly (32), and an intermediate section (42) extending between the front and rear sections of conduction housing (40) and disposed between the two footwells (35, 36);
   a power electronics housing (60) having power electronics (61) therein;
   a terminal box (50) including at least a first terminal (51) for a first consumer (91);
   first conductors (41) being provided in the conduction housing (40) and electrically interconnect the first battery module assembly (31), the second battery module assembly (32), the first terminal (51), and the power electronics (61), wherein the terminal box (50) is connected to the first conductors (41) in a region adjacent to and below the intermediate section (42) of the conduction housing (40).

2. The battery system (20) of claim 1, wherein the power electronics housing (60) is provided at least partially on a side of the second battery module assembly (32) facing away from the first battery module assembly (31).

3. The battery system (20) of claim 1, wherein at least a second terminal (62) for a second consumer (92) is provided on the power electronics housing (60).

4. The battery system (20) of claim 1, wherein the conduction housing (40) comprises a bottom tray (45) and a lid (46), at least part of the first conductor (41) extends between the bottom tray (45) and the lid (46), the bottom tray (45) has terminal regions (451, 452, 453, 454) for the first battery module assembly (31), for the second battery module assembly (32), for the terminal box (50), and for the power electronics housing (60).

5. The battery system (20) of claim 4, wherein the terminal box (50) is fastened to the bottom tray (45).

6. The battery system (20) of claim 5, further comprising at least one seal (401, 402) at least at one sealing point selected from the group consisting of:

a region between the bottom tray (45) and the terminal box (50);

a region between the bottom tray (45) and the first battery module assembly (31);

a region between the bottom tray (45) and the second battery module assembly (32);

a region between the bottom tray (45) and the power electronics housing (60); and a region between the bottom tray (45) and the lid (46).

7. The battery system (20) of claim 1, wherein the terminal box (50) comprises at least one fuse (52) to prevent excessive current through the first conductors (41), and wherein the terminal box (50) comprises an opening (53) at its bottom with a lid (54) to allow a replacement of the fuse (52) through the opening (53) when the lid (54) is removed.

8. A vehicle (10) configured as an electrically or semi-electrically vehicle (10) and comprising the battery system (20) of claim 4.

9. The vehicle of claim 8, comprising first seats (11) and second seats (12) arranged behind the first seats (11), and the footwells (35, 36) being in front of the second seats (12).

10. The vehicle of claim 8, wherein at least part of the first battery module assembly (31) is arranged under the first seats (11), and wherein at least part of the second battery module assembly (32) is arranged under the second seats (12).

11. The vehicle of claim 8, further comprising a connecting cable (93) connected to the first terminal (51), at least sections of the connection cable (93) extending from the first terminal (51) along the conduction housing (40) and into a front region (13) of the vehicle (10) to connect to the first consumer (91), and at least sections of the connecting cable (93) extending parallel to the conduction housing (40).

12. The vehicle of claim 8, further comprising removable components (100) on a bottom of the vehicle and being configured to allow a removal of the battery system (20) from the bottom of the vehicle (10).

13. A method for manufacturing the vehicle (10) of claim 8, the vehicle (10) comprising a body (15), a front axle (101), a rear axle (102), and a third consumer (91, 92) having a connecting cable (93), the method comprising:

assembling the bottom tray (45) of the conduction housing (40) to the terminal box (50) from above;

positioning the first conductors (41) on the bottom tray (45) and connecting the first conductors (41) to the first battery module assembly (31), the second battery module assembly (32), the terminal box (50), and the power electronics housing (60);

positioning and securing the lid (46) on the bottom tray (45) to produce the battery system (20);

positioning the battery system (20), the front axle (101), the rear axle (102), and the third consumer (91, 92) on an assembly support (120);

connecting the third consumer (91, 92) to the first terminal (51) or to the second terminal (62) via the connecting cable (93);

moving the battery system (20), the front axle (101), the rear axle (102), and the third consumer (91, 92) into the body (15) simultaneously; and mechanically joining the battery system (20), the front axle, (101), the rear axle (102), and the third consumer (91, 92) to the body (15).

14. The battery system of claim 1, wherein the first and second battery module assemblies (31, 32) are not enclosed in a common battery box.

15. The vehicle of claim 8, wherein the first and second battery module assemblies (31, 32) are not enclosed in a common battery box.

\* \* \* \* \*